United States Patent
Wu et al.

(10) Patent No.: US 11,593,672 B2
(45) Date of Patent: Feb. 28, 2023

(54) CONVERSATION HISTORY WITHIN CONVERSATIONAL MACHINE READING COMPREHENSION

(71) Applicants: International Business Machines Corporation, Armonk, NY (US); Rensselaer Polytechnic Institute, Troy, NY (US)

(72) Inventors: Lingfei Wu, Elmsford, NY (US); Mohammed J Zaki, Troy, NY (US); Yu Chen, Troy, NY (US)

(73) Assignee: International Business Machines Corporation, Armonk, NY (US)

( * ) Notice: Subject to any disclaimer, the term of this patent is extended or adjusted under 35 U.S.C. 154(b) by 708 days.

(21) Appl. No.: 16/547,862

(22) Filed: Aug. 22, 2019

(65) Prior Publication Data
US 2021/0056445 A1   Feb. 25, 2021

(51) Int. Cl.
*G06N 5/04*     (2006.01)
*G06F 17/16*    (2006.01)
*G06K 9/62*     (2022.01)
*G06N 3/04*     (2006.01)
*G06F 40/295*   (2020.01)

(52) U.S. Cl.
CPC ............... *G06N 5/04* (2013.01); *G06F 17/16* (2013.01); *G06F 40/295* (2020.01); *G06K 9/6276* (2013.01); *G06K 9/6298* (2013.01); *G06N 3/04* (2013.01)

(58) Field of Classification Search
CPC .......... G06N 5/04; G06N 3/04; G06N 3/0445; G06N 3/0454; G06F 17/16; G06F 40/295; G06F 40/284; G06F 40/30; G06K 9/6276; G06K 7/6298
See application file for complete search history.

(56) References Cited

U.S. PATENT DOCUMENTS 10,262,654 B2    4/2019  Hakkani-Tur et al.
2017/0242879 A1  8/2017  Hatami-Hanza

OTHER PUBLICATIONS

G. Yingjie, G. Xiaolin and L. Defu, "TT-Net: Topic Transfer-Based Neural Network for Conversational Reading Comprehension," in IEEE Access, vol. 7, pp. 116696-116705, 2019, doi: 10.1109/ACCESS.2019.2936011. (Year: 2019).*

(Continued)

*Primary Examiner* — Matthew Mikels
(74) *Attorney, Agent, or Firm* — Patterson + Sheridan, LLP (57) ABSTRACT

Aspects described herein include a method of conversational machine reading comprehension, as well as an associated system and computer program product. The method comprises receiving a plurality of questions relating to a context, and generating a sequence of context graphs. Each of the context graphs includes encoded representations of: (i) the context, (ii) a respective question of the plurality of questions, and (iii) a respective conversation history reflecting: (a) one or more previous questions relative to the respective question, and (b) one or more previous answers to the one or more previous questions. The method further comprises identifying, using at least one graph neural network, one or more temporal dependencies between adjacent context graphs of the sequence. The method further comprises predicting, based at least on the one or more temporal dependencies, an answer for a first question of the plurality of questions.

20 Claims, 2 Drawing Sheets

(56) References Cited

OTHER PUBLICATIONS

Yu Chen, Lingfei Wu, Mohammed J. Zaki, "GraphFlow: Exploiting Conversation Flow with Graph Neural Networks for Conversational Machine Comprehension", https://doi.org/10.48550/arXiv.1908.00059 (Year: 2019).*
Li et al. "Gated graph sequence neural networks." arXiv preprint arXiv:1511.05493 (2015).
Bottou, "From machine learning to machine reasoning." Machine learning 94.2 (2014): 133-149.
Belkaroui et al., "Conversational based method for tweet contextualization" Vietnam J Comput Sci (2016).
Sun et al. "Open domain question answering using early fusion of knowledge bases and text." arXiv preprint (arXiv:1809.00782 (2018).
Chen et al. "Reading wikipedia to answer open-domain questions," arXiv preprint arXiv:1704.00051, 2017, 10 pages.
Cho et al. "Learning phrase representations using rnn encoder-decoder for statistical machine translation," Proceedings of the 2014 Conference on Empirical Methods in Natural Language Processing (EMNLP), Oct. 25-29, 2014, pp. 1724-1734.
Choi et al. "Quac: Question answering in context," arXiv preprint arXiv:1808.07036, 2018, 11 pages.
Devlin et al. "Bert: Pre-training of deep bidirectional transformers for language understanding," arXiv preprint arXiv:1810.04805, 2018, 16 pages.
Hochreiter et al. "Long short-term memory," Neural computation, 9(8):1997, pp. 1735-1780.
Huang et al. "Flowqa: Grasping flow in history for conversational machine comprehension," arXiv preprint arXiv:1810.06683, 2018, 15 pages.
Kingma et al. "A method for stochastic optimization," arXiv preprint arXiv:1412.6980, 2014, 15 pages.
Lee et al. "Learning recurrent span representations for extractive question answering," arXiv preprint arXiv:1611.01436, 2016, 9 pages.
Pennington et al. "Glove: Global vectors for word representation," Proceedings of the 2014 conference on empirical methods in natural language processing (EMNLP), 2014, pp. 1532-1543.
Rajpurkar et al. "Squad: 100,000+ questions for machine comprehension of text," arXiv preprint arXiv:1606.05250, 2016, 10 pages.
Reddy et al. "Coqa: A conversational question answering challenge," arXiv preprint arXiv: 1808.07042, 2018, 16 pages.
See et al. "Get to the point: Summarization with pointer-generator networks," arXiv preprint arXiv: 1704.04368, 2017, 20 pages.
Wang et al. "Multi-granularity hierarchical attention fusion networks for reading comprehensionand question answering," arXiv preprint arXiv:1811.11934, 2018, 10 pages.
Yatskar et al. "A qualitative comparison of coqa, squad 2.0 and quac," arXiv preprint arXiv: 1809.10735, 2018, 6 pages.
Zhu et al. "Sdnet: Contextualized attention-based deep network for conversational question answering," arXiv preprint arXiv: 1812.03593, 2018, 8 pages.
Yu Chen, Lingfei Wu and Mohammed Zaki, "GraphFlow: Exploiting Conversation Flow with Graph Neural Networks for Conversational Machine Comprehension," ICMI, 2019, 9 pages (Grace Period Disclosure).

* cited by examiner

CONVERSATION HISTORY WITHIN CONVERSATIONAL MACHINE READING COMPREHENSION

STATEMENT REGARDING PRIOR DISCLOSURES BY THE INVENTOR OR A JOINT INVENTOR

The following disclosure(s) are submitted under 35 U.S.C. § 102(b)(1)(A): "GraphFlow: Exploiting Conversation Flow with Graph Neural Networks for Conversational Machine Comprehension," Yu Chen, Lingfei Wu and Mohammed Zaki, ICML 2019 Workshop, June 2019, 9 pages (Grace Period Disclosure).

BACKGROUND

The present invention relates to conversational machine reading comprehension (MRC).

Human learning is often conversation-based, and follow-up questions are asked to acquire additional information based on what has already been learned. However, most approaches to conversational MRC do not effectively capture conversation history, and as a result have trouble answering questions involving coreference (where two or more expressions in a text refer to the same entity) or ellipsis (where the questions are syntactically and/or semantically incomplete).

SUMMARY

According to one embodiment of the present invention, a method of conversational machine reading comprehension comprises receiving a plurality of questions relating to a context, and generating a sequence of context graphs. Each of the context graphs includes encoded representations of: (i) the context, (ii) a respective question of the plurality of questions, and (iii) a respective conversation history reflecting: (a) one or more previous questions relative to the respective question, and (b) one or more previous answers to the one or more previous questions. The method further comprises identifying, using at least one graph neural network, one or more temporal dependencies between adjacent context graphs of the sequence. The method further comprises predicting, based at least on the one or more temporal dependencies, an answer for a first question of the plurality of questions.

According to one embodiment of the present invention, a system comprises one or more computer processors configured to perform an operation for conversational machine reading comprehension. The operation comprises receiving a plurality of questions relating to a context, and generating a sequence of context graphs. Each of the context graphs includes encoded representations of: (i) the context, (ii) a respective question of the plurality of questions, and (iii) a respective conversation history reflecting: (a) one or more previous questions relative to the respective question, and (b) one or more previous answers to the one or more previous questions. The method further comprises identifying, using at least one graph neural network, one or more temporal dependencies between adjacent context graphs of the sequence. The method further comprises predicting, based at least on the one or more temporal dependencies, an answer for a first question of the plurality of questions.

According to one embodiment of the present invention, a computer program product comprises a computer-readable storage medium having computer-readable program code embodied therewith. The computer-readable program code is executable by one or more computer processors to perform an operation for conversational machine reading comprehension. The operation comprises receiving a plurality of questions relating to a context, and generating a sequence of context graphs. Each of the context graphs includes encoded representations of: (i) the context, (ii) a respective question of the plurality of questions, and (iii) a respective conversation history reflecting: (a) one or more previous questions relative to the respective question, and (b) one or more previous answers to the one or more previous questions. The operation further comprises identifying, using at least one graph neural network, one or more temporal dependencies between adjacent context graphs of the sequence. The operation further comprises predicting, based at least on the one or more temporal dependencies, an answer for a first question of the plurality of questions.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Figure 1:
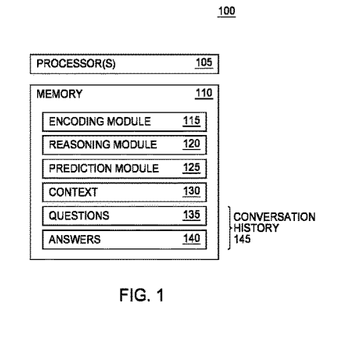
FIG. 1 is a block diagram illustrating an exemplary system capable of performing conversational machine reading comprehension, according to one or more embodiments.

FIG. 1 is a block diagram illustrating an exemplary system 100 capable of performing conversational machine reading comprehension, according to one or more embodiments.

The system 100 comprises one or more processors 105 and a memory 110. The one or more processors 105 may be implemented in any suitable form, such as a general purpose microprocessor, a controller, an application-specific integrated circuit (ASIC), and so forth. The memory 110 may include a variety of computer-readable media selected for their size, relative performance, or other capabilities: volatile and/or non-volatile media, removable and/or non-removable media, etc. Further, the one or more processors 105 and/or the memory 110 may be included in a single computing device, or may be distributed among multiple communicatively-coupled computing devices.

The memory 110 comprises a context 130 (which may also be referred to as a "passage"), a plurality of questions 135 relating to the context 130, and a plurality of answers 140 to the plurality of questions 135. The context 130, each question of the plurality of questions 135, and each answer of the plurality of answers 140 comprises a respective sequence of words in any suitable form. In some embodiments, the plurality of answers 140 are text spans taken from the context 130. In other embodiments, the plurality of answers 140 are free-form text.

The memory 110 may include one or more "modules" or "sub-modules" for performing various functions described herein. In one embodiment, each module or sub-module includes program code that is executable by the one or more processors 105. However, other embodiments may have functionality that is partially or fully implemented in hardware (i.e., circuitry) or firmware of the system 100. As shown, the system 100 comprises an encoding module 115, a reasoning module 120, and a prediction module 125, although other combinations of the described functionality are also contemplated.

The encoding module 115 generally encodes a conversation history 145 that reflects, relative to a current question of the plurality of questions 135, one or more previous questions of the plurality of questions 135, and one or more previous answers of the plurality of answers 140. The encoding module 115 may further encode text of the context 130 that aligns question embedding.

Figure 2:
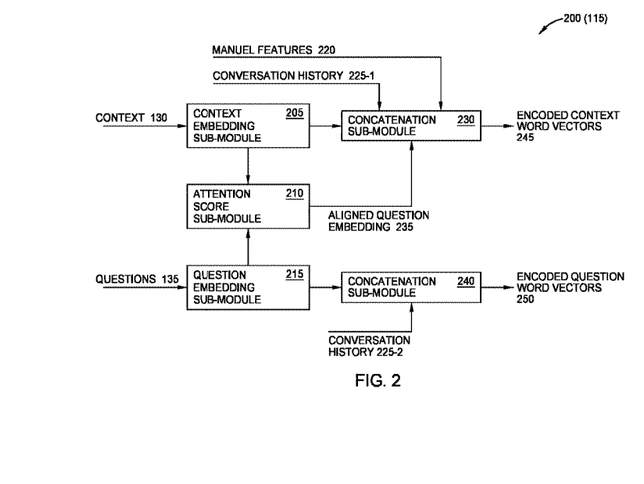
FIG. 2 is a block diagram illustrating an exemplary encoding module for performing conversational machine reading comprehension, according to one or more embodiments.

FIG. 2 is a block diagram 200 illustrating an example of the encoding module 115 for performing conversational machine reading comprehension, according to one or more embodiments. The features illustrated in the diagram 200 may be used in conjunction with other embodiments described herein.

The encoding module 115 comprises a context embedding sub-module 205 that receives the context 130, where the context 130 comprises a sequence of m words $\{c_1, c_2, \ldots, c_m\}$. The encoding module 115 further comprises a question embedding sub-module 215 that receives the plurality of questions 135, where each question $Q_i$ (at an $i^{th}$ turn of the conversation) of the plurality of questions 135 comprises a respective sequence of n words $\{q_1^{(i)}, q_2^{(i)}, \ldots, q_n^{(i)}\}$.

Each of the context embedding sub-module 205 and the question embedding sub-module 215 performs pretrained word embeddings for words of the context 130 and the plurality of questions 135, respectively, using one or more models (or algorithms). In one embodiment, the context embedding sub-module 205 and the question embedding sub-module 215 each use 300-dimension GloVe (Global Vectors for Word Representation) embeddings, as well as 1024-dimension BERT (Bidirectional Encoder Representations from Transformers) embeddings to embed each word in the context 130 and the plurality of questions 135, respectively. In some embodiments, the BERT embeddings for each word are precomputed using a weighted sum of BERT layer outputs. Different numbers and/or types of models are also contemplated for embedding the words of the context 130 and the plurality of questions 135, which may include different dimensions. Further, the numbers and/or types of the models used for the context 130 may differ from those used for the plurality of questions 135. In this way, encoding the context 130 using the encoding module 115 may comprise encoding each word of the context 130 with one or more pretrained word vectors. Further, encoding each of the plurality of questions 135 using the encoding module 115 may comprise encoding each word of the question 135 with one or more pretrained word vectors.

The encoding module 115 further comprises an attention score sub-module 210 that receives the embedded words of the context 130 from the context embedding sub-module 205, and the embedded words of the questions 135 from the question embedding sub-module 215. The attention score sub-module 210 determines an aligned question embedding 235 based on an attention score calculated between the words of the context 130 and the words of the plurality of questions 135. The various attention scores may be represented as an attention matrix. In one embodiment, the aligned question embedding 235 is determined based on a function $f_{align}(c_j^{(i)}) = \Sigma_k a_{j,k}^{(i)} g_k^{Q_i}$, where $g_k^{Q_i}$ represents the GloVe embedding of a question word $q_k^{(i)}$, and $a_{j,k}^{(i)}$ represents the attention score between a context word $c_j$ and the question word $q_k^{(i)}$. In one embodiment, the attention score is defined as $a_{j,k}^{(i)} \propto \exp(\text{ReLU}(Wg_j^C)^T \text{ReLU}(Wg_k^{Q_i}))$, where $W \in \mathbb{R}^{d \times 300}$ represents a trainable model parameter, d represents a hidden state size, and $g_j^C$ represents the GloVe embedding of the context word $c_j$. In this way, encoding the context 130 using the encoding module 115 may comprise encoding each word of the context 130 with one or more aligned question vectors.

The encoding module further comprises a concatenation sub-module 230 that receives the embedded words of the context 130 from the context embedding sub-module 205, and the aligned question embedding 235 from the attention score sub-module 210. The concatenation sub-module 230 concatenates each word of the context 130 with one or more manual features 220 and with a conversation history 225-1 (representing one example of the conversation history 145 of FIG. 1). In one embodiment, the one or more manual features 220 for each word of the context 130 include a 12-dimension part-of-speech (POS) feature, an 8-dimension named entity recognition (NER) feature, and a 3-dimension exact matching vector indicating whether the word appears in the $i^{th}$-turn question $Q_i$. In some embodiments, the one or more manual features 220 are encoded in a vector $f_{man}(c_j^{(i)})$. For example, the POS feature, the NER feature, and the exact matching vector feature may be concatenated in the vector $f_{man}(c_j^{(i)})$. Other embodiments may include different numbers and/or types of the one or more manual features 220, which may include different dimensions. In some embodiments, the conversation history 225-1 comprises a feature vector $f_{ans}(c_j^{(i)})$ that encodes locations for N (one or more) previous answers to the embedded words of the context 130. Thus, each context word $c_j^{(i)}$ is encoded by a vector $w_{C_j}^{(i)}$ to produce encoded context word vectors 245 (also represented as $W_C^{(i)}$). In some embodiments, the vector $w_{C_j}^{(i)}$ comprises a concatenation of $g_j^C$, $f_{align}(c_j^{(i)})$, $f_{man}(c_j^{(i)})$, and $f_{ans}(c_j^{(i)})$.

The encoding module further comprises a concatenation sub-module 240 that receives the embedded words of the plurality of questions 135 from the question embedding sub-module 215. The concatenation sub-module 240 concatenates each word of the plurality of questions 135 with a conversation history 225-2 (representing another example of the conversation history 145 of FIG. 1).

In some embodiments, the conversation history 225-2 comprises the N previous question-answer pairs. In one embodiment, the concatenation sub-module 240 prepends the N previous question-answer pairs to the current question of the plurality of questions 135. In one embodiment, the concatenation sub-module 240 further concatenates a 3-dimension relative turn marker embedding $f_{turn}(q_k^{(i)})$ to each word vector in the augmented question to indicate which turn the word vector belongs to. Use of the relative turn markers may prove to be more practicable than, e.g., the use of special tokens to separate the conversation history 225-2 from the current question. Thus, each question word $q_k^{(i)}$ is encoded by a vector $w_k^{Q_i}$ to produce encoded question word vectors 250 (also represented as $W^{Q_i}$). In some embodiments, the vector $w_k^{Q_i}$ comprises a concatenation of $g_k^{Q_i}$, $BERT_k^{Q_i}$, and $f_{turn}(q_k^{(i)})$. In this way, encoding each questions of the plurality of questions 135 using the encoding module 115 may comprise augmenting the question with the one or more previous questions and with the one or more previous answers, and encoding each word of the augmented question with a relative turn indicator.

Returning to FIG. 1, the reasoning module 120 dynamically constructs a question-aware context graph at each turn of a conversation, and applies one or more graph neural networks (GNNs) to process the sequence of context graphs. In some embodiments, the reasoning module 120 uses the graph node embedding outputs of a previous turn as a starting state when reasoning at a current turn, which is more similar to how humans perform conversational reasoning, when compared with other techniques such as Integration-Flow, described by Huang et al. in "FlowQA: Grasping Flow in History for Conversational Machine Comprehension" (cited in an IDS).

Figure 3:
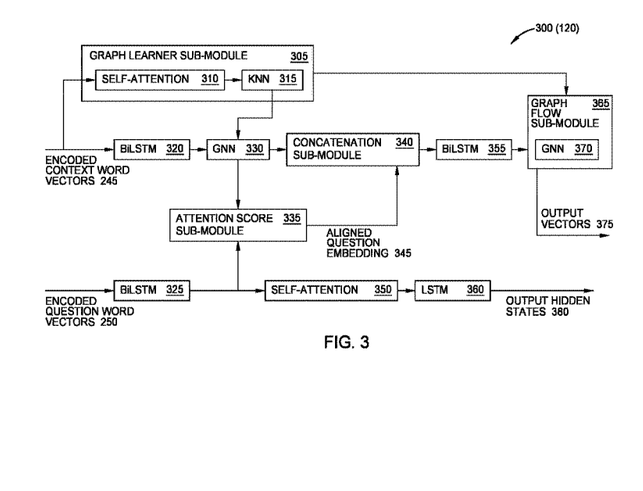
FIG. 3 is a block diagram illustrating an exemplary reasoning module for performing conversational machine reading comprehension, according to one or more embodiments.

FIG. 3 is a block diagram 300 illustrating an exemplary reasoning module 120 for performing conversational machine reading comprehension, according to one or more embodiments. The features illustrated in the diagram 300 may be used in conjunction with other embodiments described herein.

The reasoning module 120 receives the encoded context word vectors 245 and the encoded question word vectors 250 from the encoding module 115. The reasoning module 120 comprises a bidirectional long short-term memory block 325 (BiLSTM) that is applied to the encoded question word vectors 250 to obtain, for each question $Q_i$, contextualized embeddings $Q_i \in \mathbb{R}^{d \times n}$. The cotextualized embeddings $Q_i$ may be represented as $Q_i = q_1^{(i)}, \ldots, q_n^{(i)} = BiLSTM(W^{Q_i})$.

The contextualized embeddings $Q_i$ may be processed through a self-attention block 350 to represent each question $Q_i$ as a weighted sum of word vectors $\widetilde{q^{(i)}} = \Sigma_k a_k^{(i)} q_k^{(i)}$, where $a_k^{(i)} \propto \exp(w^T q_k^{(i)})$ and w is a d-dimension trainable weight. The weighted sum of word vectors $\widetilde{q^{(i)}}$ may be sequentially processed through a LSTM 360 to generate history-aware question vectors $p_1, \ldots, p_T = LSTM(\widetilde{q^{(1)}}, \ldots, \widetilde{q^{(T)}})$. In some embodiments, the output hidden states 380 of the LSTM 360 (that is, $p_1, \ldots, p_T$) are output by the reasoning module 120.

The reasoning module 120 further comprises a graph learner sub-module 305 that receives the encoded context word vectors 245. The graph learner sub-module 305 comprises a self-attention block 310 that is applied to the context representations $W_C^{(i)}$ to compute an attention matrix $A_C^{(i)}$ that serves as a weighted adjacency matrix for the context graph. In some embodiments, the attention matrix is defined as $A_C^{(i)} = ReLU(UW_C^{(i)})^T ReLU(UW_C^{(i)})$, where U represents a $d \times d_c$ trainable weight, and $d_c$ represents the embedding size of $w_{C_j}^{(i)}$.

It is possible to analyze the fully-connected context graphs within the reasoning module 120. However, this approach may be computationally expensive while providing diminishing returns. In some embodiments, the graph learner sub-module 305 generates a sparse, normalized adjacency matrix from the weighted adjacency matrix $A_C^{(i)}$. The sparse, normalized adjacency matrix may be used to provide weights for at least one graph neural network of the reasoning module 120. In some embodiments, the graph learner sub-module 305 comprises a KNN block 315 that selects K nearest neighbors for each context node of a context graph. The graph learner sub-module 305 may further apply a softmax function to the selected K nearest neighbors to generate the sparse, normalized adjacency matrix. Thus, in some embodiments, the sparse, normalized adjacency matrix is determined according to: $\widetilde{A_C^{(i)}}$ = softmax $(topk(A_C^{(i)}))$.

In this way, the graph learner sub-module 305 dynamically builds weighted context graphs to model semantic relationships among context words at each turn of a conversation. Thus, the weighted context graph depends on the semantic meanings of the context words, as well as the current question, and the conversation history. Use of the weighted context graph may serve to better answer the current question. In this way, the reasoning module 120 identifies, using at least one graph neural network, one or more temporal dependencies between adjacent context graphs of the sequence.

The weighted context graphs are provided from the graph learner sub-module 305 to a graph flow sub-module 365. Each weighted context graph in the sequence is processed using a GNN 370, and the output of the GNN 370 is used to process a next weighted context graph of the sequence.

In some embodiments, at the $i^{th}$ turn of the conversation, the graph flow sub-module 365 initializes context node embeddings by fusing original context information $C_i^{l-1}$ and updated context information at the previous turn $C_{i-1}^l$ via a fusion function. Thus, the context information may be represented as $C_i^l = GNN(\overline{C_i^{l-1}}, \widetilde{A_C^{(i)}})$, where $\overline{C_{i,j}^{l-1}} = Fuse(C_{i,j}^{l-1}, C_{i-1,j}^l)$ and where l is the graph flow layer index.

Thus, in some embodiments, the graph node embedding outputs of the reasoning process for the previous turn are used as a starting state when reasoning for the current turn. The context information at the first turn may be set as $\overline{C_0^{l-1}} = C_0^{l-1}$ as there is not historical information to be incorporated at the first turn. Although there is no direct link between $c_j$ at the $(i-1)^{th}$ turn and $c_k$ at the $i^{th}$ turn, the information flow may be propagated between them as the GNN progresses, which indicates that information can be exchanged among all the context words both spatially and temporally.

In some embodiments, the GNN 370 comprises a gated GNN (GGNN). For the GGNN, the aggregated neighborhood information for each context node is computed as a weighted sum of its neighboring node embeddings, where the weights are derived from the sparse, normalized adjacency matrix $\widetilde{A}_c^{(i)}$. In some embodiments, the fusion function may be a gated sum of two information sources: Fuse(a, b)=z×a+(1−z)×b, where z=σ($W_z$[a; b; a×b; a−b]+$b_z$), where σ represents a sigmoid function, and where z represents a gating vector. For simplicity, the context information may be notated as $C^l$=GraphFlow($C_i^{l-1}, \widetilde{A}_c$), which receives the previous graph context node embeddings $C_i^{l-1}$ and the normalized adjacency matrix $\widetilde{A}_c$ and updates the graph context node embeddings.

The GNN 370 generally models global interactions among context words. Local interactions among consecutive context words may be also be modeled by the reasoning module 120. In some embodiments, a BiLSTM block 320 is applied to the context representations $W_C^{(i)}$, and the output $C_i^0$ may be used as the initial context node embedding.

The context may be modeled with different levels of granularity. In some embodiments, identifying the one or more temporal dependencies between adjacent context graphs of the sequence comprises applying a first graph neural network (GNN 330) to a low-level representation of the context according to $C^1$=GraphFlow($C^0, \widetilde{A}_c$), and applying a second graph neural network (GNN 370) to a high-level representation of the context according to $H_i^C$=[$C_i^1$; $g^C$; $BERT^C$]. At the same time, a latent representation of the question may be computed according to $H_i^Q$=[$Q_i$; $g^{Q_i}$; $BERT^{Q_i}$].

An attention score sub-module 335 receives the contextualized embeddings $Q_i$, the high-level context representation $H_i^C$, and the latent question representation $H_i^Q$. In some embodiments, the attention score sub-module 335 generates the aligned question embedding 345 according to: $f_{align}^2(C^{(i)})$=Align($H_i^C, H_i^Q, Q_i$). A concatenation sub-module 340 concatenates the low-level context representation $C^1$ and the aligned question embedding 345, and a BiLSTM block 355 is applied to generate a context node embedding according to: $\widetilde{C_i^1}$=BiLSTM([$C_i^1$; $f_{align}^2(C^{(i)})$]). The context node embedding $\widetilde{C_i^1}$ is provided to GNN 370, which in some embodiments generates output vectors according to $C^2$=GraphFlow($\widetilde{C_i^1}, \widetilde{A}_c$). In some embodiments, the output vectors 375 of the graph flow sub-module 365 are also output by the reasoning module 120. Using the graph flow sub-module 365, the reasoning module 120 more closely mimics human reasoning processes than other techniques (such as FlowQA and CoQA), and demonstrates superior performance compared to other techniques.

Generally, the prediction module 125 predicts the plurality of answers 140 for the plurality of questions 135. In some embodiments, predicting the plurality of answers 140 is based on the matching score of the question embedding and the learned graph node embeddings for the context 130 at each turn of the conversation.

Figure 4:
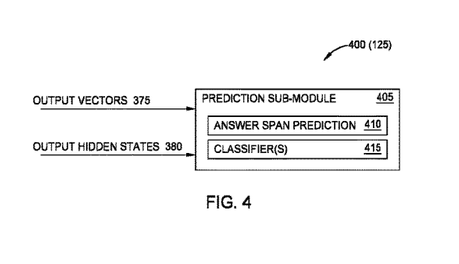
FIG. 4 is a block diagram illustrating an exemplary prediction module for performing conversational machine reading comprehension, according to one or more embodiments.

FIG. 4 is a block diagram 400 illustrating an exemplary prediction module 125 for performing conversational machine reading comprehension, according to one or more embodiments. The features illustrated in the diagram 400 may be used in conjunction with other embodiments described herein.

A prediction sub-module 405 of the prediction module 125 receives the output vectors 375 and the output hidden states 380. The prediction sub-module 405 comprises an answer span prediction block 410 that computes start probabilities and end probabilities for each word of the context, and predicts the answer spans based on the start probabilities and the end probabilities. In some embodiments, the start probability $P_{i,j}^S$ and the end probability $P_{i,j}^E$ of the $j^{th}$ context word for the $i^{th}$ question are calculated according to: $P_{i,j}^S \propto \exp(c_{i,j}^{2T} W_S p_i)$, $\widetilde{p}_i$=GRU($p_i$, $\Sigma_j P_{i,j}^S c_{i,j}^2$), and $P_{i,j}^E \propto \exp(c_{i,j}^{2T} W_E \widetilde{p}_i)$, where $W_S$ and $W_E$ represent d×d trainable weights and GRU represents a Gated Recurrent Unit.

In some embodiments, the prediction sub-module 405 further comprises one or more classifiers 415 that are trained to handle difficult questions—e.g., questions that are unanswerable from the context, questions having answers that are not text spans in the context, and so forth. Different numbers and/or types of classifiers may be used based on the types of questions. For example, using the CoQA benchmark dataset, the one or more classifiers 415 includes a multi-class classifier that classifies a question into one of four categories: "unknown", "yes", "no", and "other". In this case, the answer span prediction block 410 may be used only when the question type is "other". In another example, using the QuAC benchmark dataset, the one or more classifiers 415 may include three separate classifiers: a first classifier that handles a binary classification task (e.g., "unknown"), and two classifiers that handle multi-class classification tasks (e.g., "yes/no" and "followup"). In some embodiments, each of the classifiers is defined as: $\overline{c_i^2}$=[$f_{mean}(C_i^2)$; $f_{max}(C_i^2)$], $P_i^C$=σ($f_C(p_i)\overline{c_i^{2T}}$), where $f_C$ represents a linear layer for binary classification and a dense layer for multi-class classification, which maps a d-dimension vector to a (num_class×2d)-dimension vector. Further, σ represents a sigmoid function for binary classification, and a softmax function for multi-class classification. Still further, $\overline{c_i^2}$ may represent the whole context at the $i^{th}$ turn, which may be a concatenation of average pooling and max pooling outputs of $C_i^2$.

Figure 5:
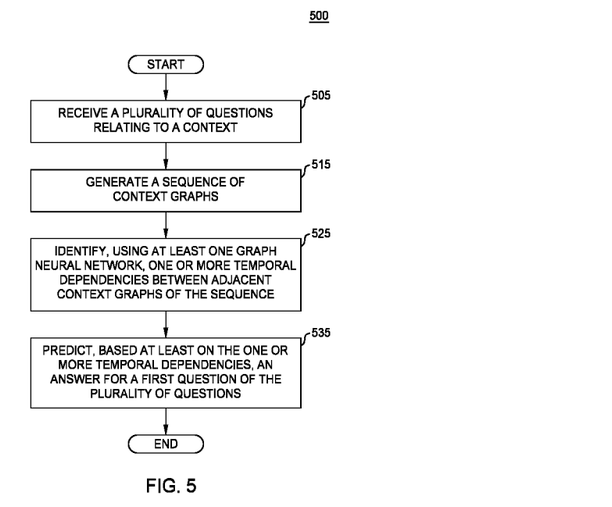
FIG. 5 is an exemplary method of performing conversational machine reading comprehension, according to one or more embodiments.

FIG. 5 is an exemplary method 500 of performing conversational machine reading comprehension, according to one or more embodiments. The method 500 may be performed in conjunction with other embodiments, e.g., performed using the system 100 of FIG. 1. Method 500 begins at block 505, where the system 100 receives a plurality of questions relating to a context.

At block 515, the system 100 generates a sequence of context graphs. In some embodiments, generating the sequence of context graphs comprises encoding each question of the plurality of questions, wherein encoding each question comprises encoding each word of the question with one or more of: one or more previous questions, one or more previous answers, one or more pretrained word vectors, and a relative turn indicator. In some embodiments, generating the sequence of context graphs comprises encoding the context, wherein encoding the context comprises encoding each word of the context with one or more of: one or more pretrained word vectors, one or more aligned question vectors, one or more manual features, and locations for the one or more previous answers. In some embodiments, generating the sequence of context graphs comprises computing a respective weighted adjacency matrix for each context graph, and generating a respective sparse, normalized adjacency matrix from the weighted adjacency matrix.

At block 525, the system 100 identifies, using at least one graph neural network, one or more temporal dependencies between adjacent context graphs of the sequence. In some embodiments, identifying the one or more temporal dependencies comprises applying a first graph neural network to low-level representation of the context, and applying a second graph neural network to a high-level representation of the context.

At block 535, the system predicts, based at least one the one or more temporal dependencies, an answer for a first question of the plurality of questions. In some embodiments, predicting the answer for the first question comprises computing start probabilities and end probabilities for each word of the context, and predicting answer spans based on the start probabilities and the end probabilities. The method 500 ends following completion of the block 535.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of conversational machine reading comprehension, the method comprising:
receiving a plurality of questions relating to a context;
generating a sequence of context graphs, wherein each of the context graphs in the sequence includes encoded representations of: (i) the context, (ii) a respective question of the plurality of questions, and (iii) a respective conversation history reflecting: (a) one or more previous questions relative to the respective question, and (b) one or more previous answers to the one or more previous questions;
identifying, using at least one graph neural network, one or more temporal dependencies between a first context graph and a second context graph in the sequence of context graphs, wherein the first context graph is adjacent to the second context graph in the sequence; and
predicting, based at least on the one or more temporal dependencies, an answer for a first question of the plurality of questions.

2. The method of claim 1, wherein generating the sequence of context graphs comprises:
encoding each question of the plurality of questions, wherein encoding each question comprises encoding each word of the question with one or more of: one or more previous questions, one or more previous answers, one or more pretrained word vectors, and a relative turn indicator.

3. The method of claim 1, wherein generating the sequence of context graphs comprises:
encoding the context, wherein encoding the context comprises encoding each word of the context with one or more of: one or more pretrained word vectors, one or more aligned question vectors, one or more manual features, and locations for the one or more previous answers.

4. The method of claim 1, wherein the encoded representation of the context includes the encoded representations of the respective question and the respective conversation history, wherein generating the sequence of context graphs comprises:
computing a respective weighted adjacency matrix for each context graph; and
generating a respective sparse, normalized adjacency matrix from the weighted adjacency matrix,
wherein the sparse, normalized adjacency matrix provides weights for the at least one graph neural network.

5. The method of claim 4, wherein generating the sparse, normalized adjacency matrix comprises:
extracting a sparse graph from the weighted adjacency matrix, wherein extracting the sparse graph comprises selecting K nearest neighbors for each node of the context graph corresponding to the weighted adjacency matrix; and
applying a softmax function to the selected K nearest neighbors.

6. The method of claim 1, wherein identifying the one or more temporal dependencies comprises:
applying a first graph neural network to low-level representation of the context; and
applying a second graph neural network to a high-level representation of the context.

7. The method of claim 1, wherein predicting the answer for the first question comprises:
computing start probabilities and end probabilities for each word of the context; and
predicting answer spans based on the start probabilities and the end probabilities.

8. A system comprising:
one or more computer processors configured to perform an operation for conversational machine reading comprehension, the operation comprising:
receiving a plurality of questions relating to a context;
generating a sequence of context graphs, wherein each of the context graphs includes encoded representations of: (i) the context, (ii) a respective question of the plurality of questions, and (iii) a respective conversation history reflecting: (a) one or more previous questions relative to the respective question, and (b) one or more previous answers to the one or more previous questions;
identifying, using at least one graph neural network, one or more temporal dependencies between adjacent context graphs of the sequence; and
predicting, based at least on the one or more temporal dependencies, an answer for a first question of the plurality of questions.

9. The system of claim 8, wherein generating the sequence of context graphs comprises:
encoding each question of the plurality of questions, wherein encoding each question comprises encoding each word of the question with one or more of: one or more previous questions, one or more previous answers, one or more pretrained word vectors, and a relative turn indicator.

10. The system of claim 8, wherein generating the sequence of context graphs comprises:
encoding the context, wherein encoding the context comprises encoding each word of the context with one or more of: one or more pretrained word vectors, one or more aligned question vectors, one or more manual features, and locations for the one or more previous answers.

11. The system of claim 8, wherein the encoded representation of the context includes the encoded representations of the respective question and the respective conversation history, wherein generating the sequence of context graphs comprises:
computing a respective weighted adjacency matrix for each context graph; and
generating a respective sparse, normalized adjacency matrix from the weighted adjacency matrix,
wherein the sparse, normalized adjacency matrix provides weights for the at least one graph neural network.

12. The system of claim 11, wherein generating the sparse, normalized adjacency matrix comprises:
extracting a sparse graph from the weighted adjacency matrix, wherein extracting the sparse graph comprises selecting K nearest neighbors for each node of the context graph; and applying a softmax function to the selected K nearest neighbors.

13. The system of claim 8, wherein identifying the one or more temporal dependencies comprises:
applying a first graph neural network to low-level representation of the context; and
applying a second graph neural network to a high-level representation of the context.

14. The system of claim 8, wherein predicting the answer for the first question comprises:
computing start probabilities and end probabilities for each word of the context; and
predicting answer spans based on the start probabilities and the end probabilities.

15. A computer program product comprising:
a computer-readable storage medium having computer-readable program code embodied therewith, the computer-readable program code executable by one or more computer processors to perform an operation for conversational machine reading comprehension, the operation comprising:
receiving a plurality of questions relating to a context;
generating a sequence of context graphs, wherein each of the context graphs includes encoded representations of: (i) the context, (ii) a respective question of the plurality of questions, and (iii) a respective conversation history reflecting: (a) one or more previous questions relative to the respective question, and (b) one or more previous answers to the one or more previous questions;
identifying, using at least one graph neural network, one or more temporal dependencies between adjacent context graphs of the sequence; and
predicting, based at least on the one or more temporal dependencies, an answer for a first question of the plurality of questions.

16. The computer program product of claim 15, wherein generating the sequence of context graphs comprises:
encoding each question of the plurality of questions, wherein encoding each question comprises encoding each word of the question with one or more of: one or more previous questions, one or more previous answers, one or more pretrained word vectors, and a relative turn indicator.

17. The computer program product of claim 15, wherein generating the sequence of context graphs comprises:
encoding the context, wherein encoding the context comprises encoding each word of the context with one or more of: one or more pretrained word vectors, one or more aligned question vectors, one or more manual features, and locations for the one or more previous answers.

18. The computer program product of claim 15, wherein the encoded representation of the context includes the encoded representations of the respective question and the respective conversation history, wherein generating the sequence of context graphs comprises:
computing a respective weighted adjacency matrix for each context graph; and
generating a respective sparse, normalized adjacency matrix from the weighted adjacency matrix,
wherein the sparse, normalized adjacency matrix provides weights for the at least one graph neural network.

19. The computer program product of claim 18, wherein generating the sparse, normalized adjacency matrix comprises:
extracting a sparse graph from the weighted adjacency matrix, wherein extracting the sparse graph comprises selecting K nearest neighbors for each node of the context graph; and
applying a softmax function to the selected K nearest neighbors.

20. The computer program product of claim 15, wherein identifying the one or more temporal dependencies comprises:
applying a first graph neural network to low-level representation of the context; and
applying a second graph neural network to a high-level representation of the context.

* * * * *